United States Patent
Kitajima

(10) Patent No.: US 8,165,217 B2
(45) Date of Patent: Apr. 24, 2012

(54) IMAGE DECODING APPARATUS AND METHOD FOR DECODING PREDICTION ENCODED IMAGE DATA

(75) Inventor: Kotaro Kitajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1183 days.

(21) Appl. No.: 11/914,905

(22) PCT Filed: May 22, 2006

(86) PCT No.: PCT/JP2006/310602
§ 371 (c)(1),
(2), (4) Date: Nov. 19, 2007

(87) PCT Pub. No.: WO2006/126694
PCT Pub. Date: Nov. 30, 2006

(65) Prior Publication Data
US 2009/0129471 A1    May 21, 2009

(30) Foreign Application Priority Data
May 27, 2005  (JP) ................. 2005-156197

(51) Int. Cl.
*H04N 7/12* (2006.01)

(52) U.S. Cl. .................. 375/240.24; 375/240.1
(58) Field of Classification Search .......... 370/240.1, 370/240.12, 240.01, 240.24, 246; 375/240.1, 375/240.12, 240.01, 240.24, 246
See application file for complete search history.

(56) References Cited

U.S. PATENT DOCUMENTS

| 6,415,055 B1 * | 7/2002 | Kato ............................. 382/236 |
| 7,515,635 B2 * | 4/2009 | Hagai et al. ............... 375/240.12 |
| 2004/0234143 A1 * | 11/2004 | Hagai et al. .................. 382/238 |

FOREIGN PATENT DOCUMENTS

| EP | 0 545 323 | 6/1993 |
| JP | 2004-532540 | 10/2004 |
| WO | 02/071639 | 9/2002 |
| WO | WO 02/071639 A | 9/2002 |
| WO | WO 2004/064373 A | 7/2004 |

OTHER PUBLICATIONS

B-M Jeon et al.: "Advanced Temporal Direct Mode in B Pictures", Electronic Letters, vol. 40, No. 4, pp. 234-235, Feb. 19, 2004.

(Continued)

*Primary Examiner* — Brenda H Pham
(74) *Attorney, Agent, or Firm* — Fitzpatrick, Cella, Harper & Scinto

(57) ABSTRACT

An image data decoding method for decoding compression encoded image data which includes a plurality of image pictures, includes: a selection step of selecting, when one of the plurality of image pictures are to be decoded, and when a first reference picture to be referred to by that image picture to be decoded is not decoded, a second reference picture from a picture already decoded as an alternative reference; and a decoding step of decoding the image picture to be decoded with reference to the second reference picture as an alternative to the first reference picture.

18 Claims, 11 Drawing Sheets

OTHER PUBLICATIONS

J. Zheng, et al.: "Multiple Description Coding Using Multiple Reference Frame for Robust Video Transmission", Proceedings of the IEEE International Symposium on Circuits and Systems (ISCAS 2005), Kobe, Japan, pp. 4006-4009, May 23, 2005.

M. Karczewicz, et al.: "The SP- and SI- Frames Design for H.264/AVC", IEEE Transactions on Circuits and Systems for Video Technology, vol. 13, No. 7, pp. 637-644, Jul. 2003.

C-T Hsu, et al.: "Fast Reference Frame Selection Method for Motion Estimation in JVT/H.264", IEEE Transactions on Communications, vol. E87-B, No. 12, pp. 3827-3830, Dec. 2004.

H-J Li, et al.,: "Fast Multiple Reference Frame Selection Method for Motion Estimation in JVT/H.264", The 2004 IEEE Asia-Pacific Conference on Circuits and Systems, Taiwan, vol. 1, pp. 605-608, Dec. 6, 2004.

\* cited by examiner

IMAGE DECODING APPARATUS AND METHOD FOR DECODING PREDICTION ENCODED IMAGE DATA

TECHNICAL FIELD

The present invention relates to an image decoding apparatus and method, an image encoding apparatus and method, and a computer program.

BACKGROUND ART

In recent years, an encoding technology which encodes image data at a high compression rate with high image quality to handle motion image information as digital data and to use it in storage and transmission is demanded. In order to compress image information, a method such as MPEG or the like, which compression-encodes image information by orthogonal transformation, such as discrete cosine transformation or the like, and motion prediction/motion compensation by utilizing redundancy unique to the image information, has been proposed and prevalent.

Also, in recent years, H.264 (also called MPEG4 Part 10:AVC) as an encoding method that aims at higher compression rate and higher image quality is available. Compared to conventional encoding methods such as MPEG2, MPEG4, and the like, this H.264 requires a more arithmetic volume in encoding processing and decoding processing but can attain a higher encoding rate (for details of the H.264 standard, see ISO/IEC 14496-10 (Mpeg-4 Part 10)).

Such encoding methods compress an information size by reducing temporally redundant information. The temporally redundant information can be reduced by performing detection of motion information for respective blocks and generation of a prediction image with reference to temporally old and future information between image pictures, calculating a differential value between the obtained prediction image and the current frame image, and encoding this differential value.

Note that "picture" is a term representing one screen, and means a frame image in a progressive image, and a frame or field image in an interlaced image.

FIG. 10 shows the types of pictures and their reference relationship in H.264. Referring to FIG. 10, symbols I, P, and B respectively represent the types of pictures, i.e., I (intra encoding) picture, P (forward prediction encoding) picture, and B (bidirectional prediction encoding) picture. Numerals that follow the symbols indicate the numbers of pictures. In this case, a smaller picture number indicates data which is to be played back earlier in terms of time. For example, in FIG. 10, P5 picture is to be played back after B1 picture. P5 picture is tied with B1 picture via an arrow. Such arrow represents the reference relationship between pictures. Therefore, P5 picture refers to B1 picture, and the difference between P5 and B1 pictures is encoded for P5 picture.

In FIG. 10, I2 and I17 are I pictures. Such I pictures are encoded being restricted within each picture, and do not refer to other pictures. P pictures such as P5, P8, P11, and P14 pictures refer to only pictures which exist before the picture of interest in terms of time, and the differences between the pictures are encoded. Furthermore, B0, B1, B3, B4, B6, B7, B9, B10, B12, B13, B15, and B16 are B pictures. Each of such B pictures refers to two pictures irrespective of the temporal relationship, and the difference between the pictures is encoded. Note that P and B pictures may include blocks which do not refer to other pictures and are encoded within pictures.

In H.264, a reference destination is designated for each block as a small region included in each picture, and such blocks in each picture can refer to blocks in different pictures. FIG. 11 shows this reference relationship. Referring to FIG. 11, P5 picture as P picture includes P5 ($a$) block and P5($b$) block. P5($a$) block refers to B1($a$) block in B1 picture, while P5($b$) block refers to I2($b$) block in I2 picture.

In H.264, I, P, and B can be designated for respective slices as units smaller than pictures. However, for the sake of simplicity, the following explanation will be given under the assumption that one picture includes the same type (I, P, B) of slices.

In order to decode data encoded using an inter-picture difference, a picture to be referred to must already be decoded. A case will be examined below wherein only I picture and P picture of encoded data having the reference relationship shown in FIG. 11 are extracted to make search playback. Upon decoding I2 picture, I2 picture can be decoded without problems since it is internally encoded. Next, as for P5 picture, since P5($b$) block in P5 picture refers to I2($b$) block of I2 picture already decoded, it can be decoded. However, since P5($a$) block refers to B1($a$) block of B1 picture which is not decoded yet, it cannot be decoded intact. In this way, upon decoding only I picture and P picture, only some blocks of P picture and I picture can be decoded.

Also, I picture alone can be extracted and decoded upon playback. However, one I picture is included per, e.g., 15 pictures even when the same picture configuration as in MPEG2 is adopted. Therefore, in playback that extracts only I pictures, a low-speed (e.g., triple speed) search cannot be conducted.

Even in a case other than the search, when playback is started from the middle (e.g., B picture) of an image stream, a picture to be referred to often may not be decoded. In such case, decoding must be done by returning or advancing the control to I picture (IDR picture) as a reference, and it is difficult to immediately decode and play back an image.

DISCLOSURE OF INVENTION

The present invention has been made in consideration of the above problems, and has as its object to decode and play back an image as an approximate image even when a picture as a reference of that image is not decoded upon decoding the image.

In order to achieve the above object, according to the present invention, there is provided an image data decoding method for decoding compression encoded image data which includes a plurality of image pictures, characterized by comprising: a selection step of selecting, when one of the plurality of image pictures are to be decoded, and when a first reference picture to be referred to by that image picture to be decoded is not decoded, a second reference picture from a picture already decoded as an alternative reference; and a decoding step of decoding the image picture to be decoded with reference to the second reference picture as an alternative to the first reference picture.

Other features and advantages of the present invention will be apparent from the following description taken in conjunction with the accompanying drawings, in which like reference characters designate the same or similar parts throughout the figures thereof.

BEST MODE FOR CARRYING OUT THE INVENTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided show that this disclosure will be thorough and complete, and will fully convey the scope of the invention to those skilled in the art. Like numbers refer to like elements throughout.

[First Embodiment]

Figure 1:
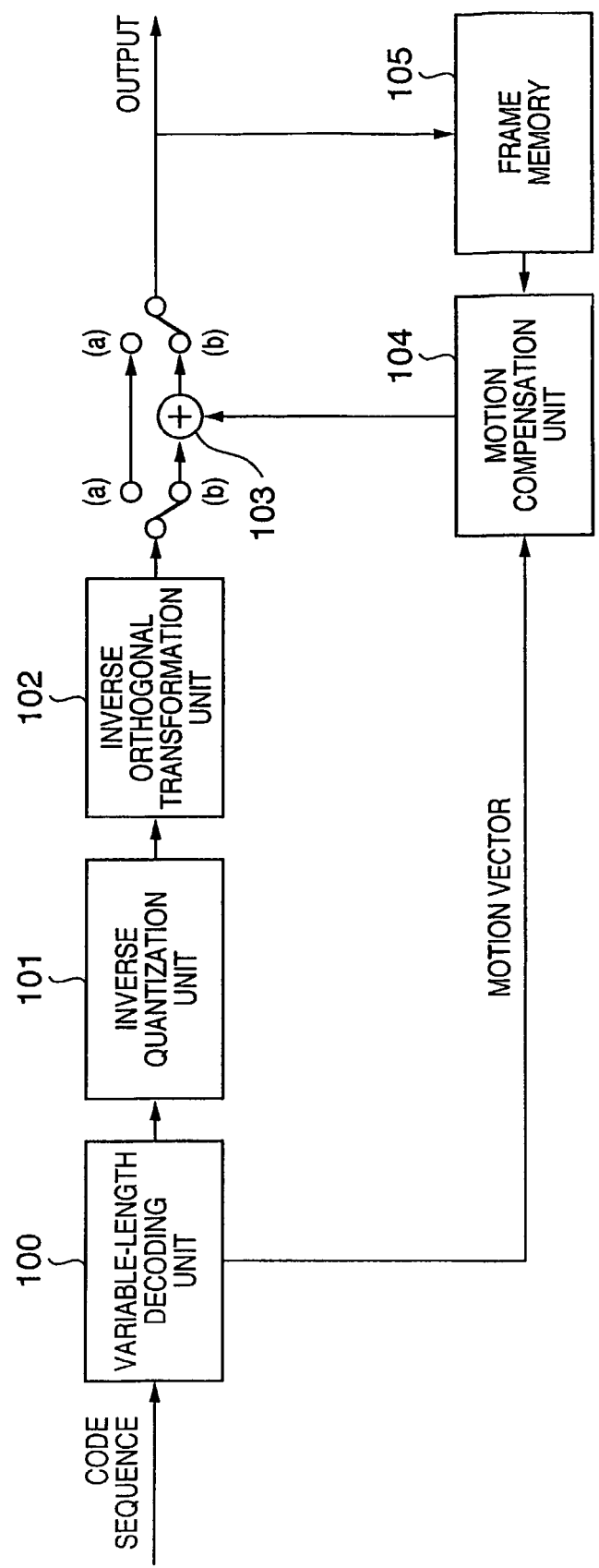
FIG. 1 is a block diagram showing an example of the arrangement of an image decoding apparatus according to the first embodiment of the present invention.

FIG. 1 is a block diagram showing an example of the arrangement of an image decoding apparatus which decodes data compression-encoded by the H.264 encoding method according to this embodiment. Referring to FIG. 1, reference numeral 100 denotes a variable-length decoding unit; 101, an inverse quantization unit; 102, an inverse orthogonal transformation unit; 103, an adder; 104, a motion compensation unit; and 105, a frame memory.

The operation of the image decoding apparatus will be described below with reference to FIG. 1. Upon reception of a compression-encoded code sequence, the variable-length decoding unit 100 executes variable-length decoding processing to decode the input code sequence to quantized orthogonal transformation coefficients and image related information, and outputs them to the inverse quantization unit 101. At this time, since the image related information includes motion vector data, the motion vector data is output to the motion compensation unit 104. The inverse quantization unit 101 inversely quantizes the input quantized orthogonal transformation coefficients based on quantization values stored in a quantization table (not shown), and outputs the obtained orthogonal transformation coefficients to the inverse orthogonal transformation unit 102.

The inverse orthogonal transformation unit 102 applies inverse orthogonal transformation to the orthogonal transformation coefficients as frequency components to convert them into original image data. When image data to be output from the inverse orthogonal transformation unit 102 is intra-picture encoded data (i.e., I picture data), it is connected to a terminal (a) and is externally output. At this time, the image data is also stored in the frame memory 105. On the other hand, when this output image data is image data which refers to another image data upon encoding (i.e., P picture or B picture), that image data is connected to a terminal (b) and is added to a prediction image output from the motion compensation unit 104 by the adder 103, and the sum data is output. At this time, the sum data is also stored in the frame memory 105. The motion compensation unit 104 generates a prediction image by applying processing to be described later to image data stored in the frame memory 105 by utilizing the motion vector data output from the variable-length decoding unit 100.

Figure 2:
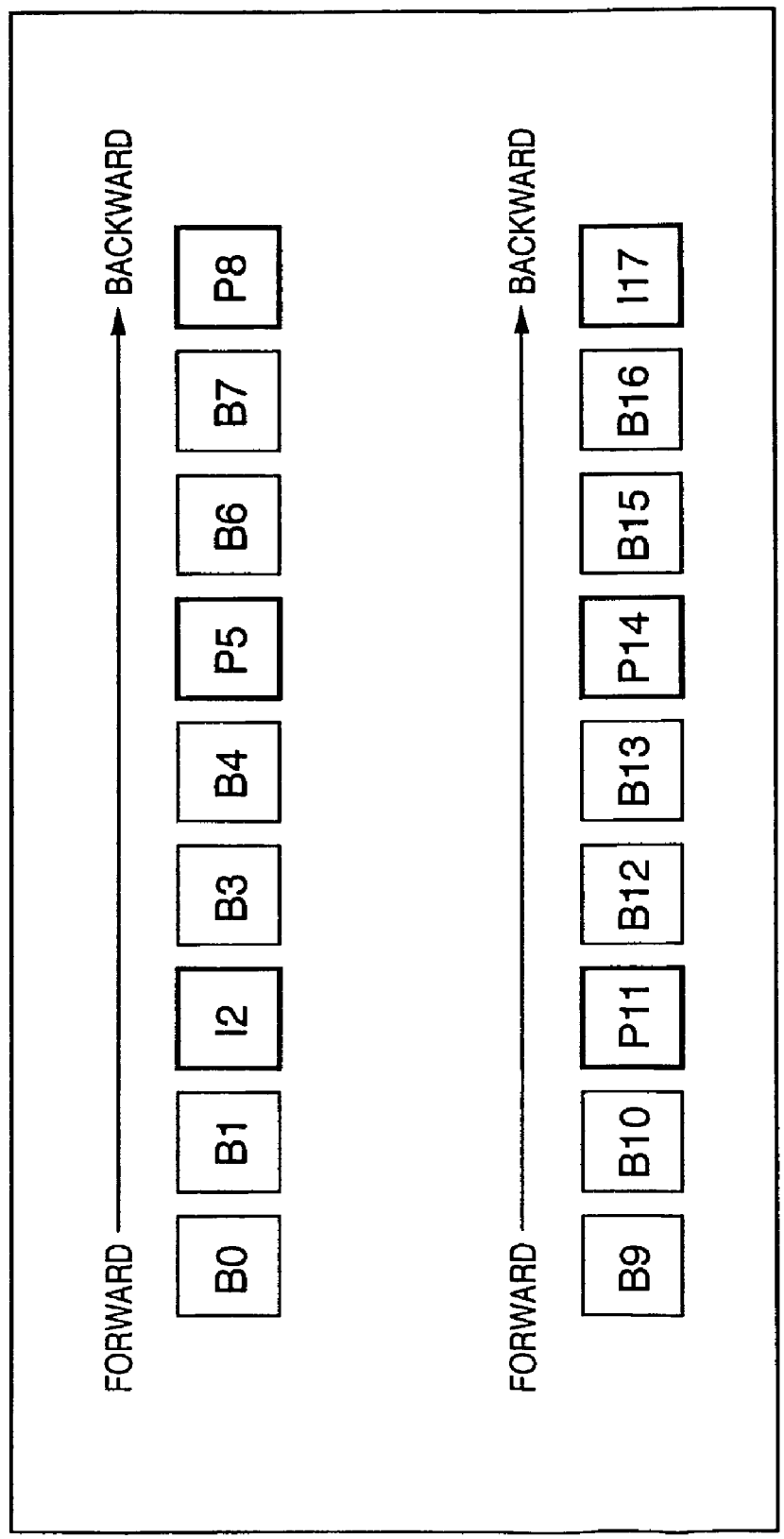
FIG. 2 shows a picture configuration of an image sequence according to the first embodiment of the present invention.

Details of the operation of the motion compensation unit 104 in the image decoding apparatus shown in FIG. 1 will be described below with reference to FIGS. 2 to 4. FIG. 2 shows an example of a picture sequence of image data to be decoded. In FIG. 2, I, P, and B indicate the types of pictures, and numbers indicate the time order upon playback.

Figure 3:
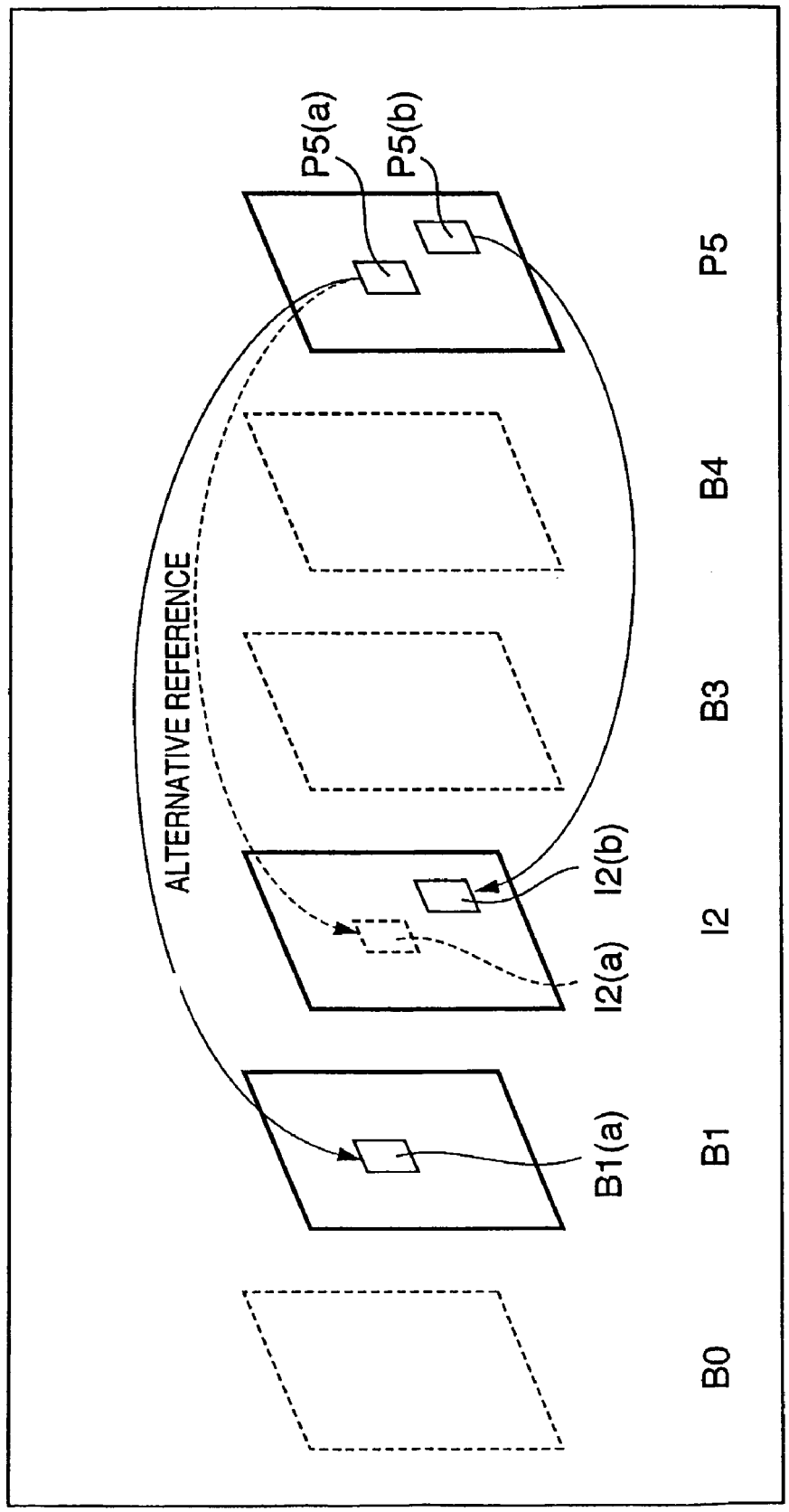
FIG. 3 is a view for explaining an alternative reference of a picture according to the first embodiment of the present invention.
Figure 4:
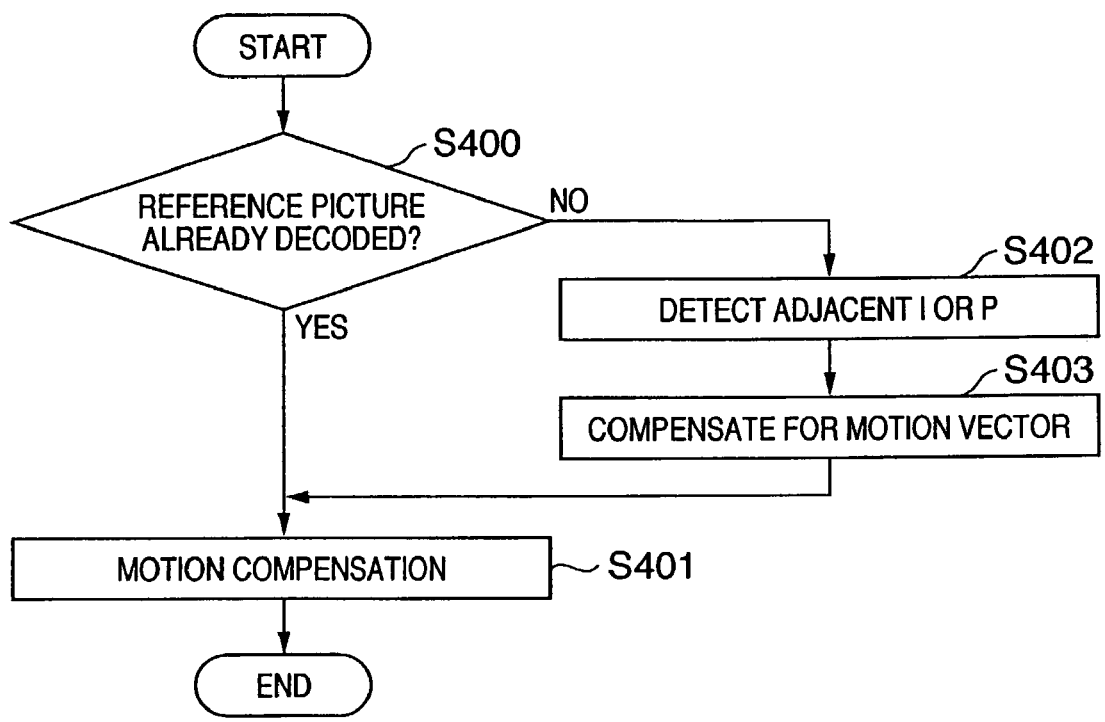
FIG. 4 is a flowchart showing an example of the flow of processing of a motion compensation unit according to the first embodiment of the present invention.

FIG. 3 partially shows the reference relationship from B0 picture to P5 picture in FIG. 2. In FIG. 3, P5(a) and P5(b) indicate unit blocks of motion reference, and solid arrows indicate references upon encoding. That is, P5(a) block refers to B1(a) block, and P5(b) block refers to I2(b) block. In this way, an image picture is broken up into blocks. As a block size, one of 16×16 pixels, 16×8 pixels, 8×16 pixels, and 8×8 pixels can be selected, and in case of 8×8 pixels, one of 8×4 pixels, 4×8 pixels, and 4×4 pixels can be selected as smaller blocks.

A case will be described in detail below wherein the code sequence shown in FIG. 2 is input to the image decoding apparatus shown in FIG. 1. In the following description, a case will be exemplified wherein triple-speed search playback is to be executed by extracting only I and P pictures from image data with the picture configuration shown in FIG. 2. In the example to be described below, assume that the image decoding apparatus of this embodiment is applied to an image playback apparatus, and search playback is attained using a n times speed playback function in the image playback apparatus.

When a code sequence of I2 picture is input to the variable-length decoding unit 100, since I picture is intra-picture encoding data, as described above, data output from the inverse orthogonal transformation unit 102 in FIG. 1 is directly externally output. Since I2 picture is referred to from P5 picture, its data is output to and stored in the frame memory 105.

When a code sequence of P5 picture is decoded by the variable-length decoding unit 100, its motion vector information is output to the motion compensation unit 104, and its image data is output to the adder 103 via the inverse quantization unit 101 and inverse orthogonal transformation unit 102.

A practical operation of the motion compensation unit 104 upon decoding P5 picture will be described below with reference to the flowchart of FIG. 4. FIG. 4 is a flowchart showing the flow of the processing of the motion compensation unit. When image data included in P5(b) block is to be decoded, it is checked in step S400 if its reference picture has been decoded. In this case, P5(b) block refers to I2 picture. Since I2 picture has already been decoded, as described above, it is determined that the reference picture has been decoded ("YES" in step S400), and the flow advances to step S401. In step S401, motion compensation is made based on I2 picture and motion vector information stored in the frame memory 105 to generate a image of I2(b) block as a prediction image. The generated prediction image is output to the adder 103 and is added to the decoded image signal by the adder 103, thus decoding an image signal of P5(b) block. In this way, the decoding processing of P5(b) block is completed.

Upon executing decoding processing of P5(a) block, it is similarly checked in step S400 if its reference picture has been decoded. As shown in FIG. 3, P5(a) block refers to B1 picture. However, in this case, since the triple-speed search playback is performed, B1 picture as B picture is not decoded. Hence, it is determined that the reference picture has not been decoded yet ("NO" in step S400). Therefore, the flow advances to step S402. In step S402, I picture or P picture which is most adjacent to the reference picture in terms of time is detected. That is, this embodiment uses the detected adjacent I or P picture as an alternative picture to that B picture to be originally referred to.

More specifically, in the example of FIGS. 2 and 3, I2 picture as I or P picture which is most adjacent to B1 picture in terms of time is detected. This I2 picture is referred to as an alternative to B1 picture. In step S403, compensation processing of the motion vector information is executed.

This compensation processing will be described in detail below. The motion vector information for P5(a) block is that generated when B1(a) block is referred to. Therefore, when that motion vector is applied to I2 picture intact, the error increases, e.g., when motion is large. Therefore, the motion vector must be compensated for according to a display timing. Paying attention to a difference between block in terms of time, B1 picture has a difference for four pictures and I2 picture has a difference for three pictures from P5 picture. Therefore, by multiplying the motion vector to B1(a) block by ¾, a compensated motion vector to I2(a) block can be generated.

After the motion vector is compensated in step S403 in such way, the flow advances to step S401. In step S401, motion compensation is executed based on the compensated motion vector and I2 picture stored in the frame memory 105, thus generating a block corresponding to I2(a) as a prediction image. The generated prediction image is output to the adder 103, and is added to the decoded image signal by the adder 103, thus decoding an original image signal.

In this manner, even when the reference picture has not been decoded yet upon image decoding, a picture already decoded which is most adjacent to the reference picture in terms of time is alternatively referred to, thus decoding an image. As a result, flexible playback such as search or the like can be attained.

Note that the addition processing is executed based on the compensated motion vector in the above description. However, when the motion vector is large, the addition processing of the adder 103 may be skipped, and the prediction image may be output intact. This is because when the adjacent picture is alternatively referred to, an error is already generated from an image of an original reference, and if the decoded signal is added to that image including the error, the error may be further increased.

[Another Method of Selecting Picture to be Referred to as Alternative]

In the above description, I or P picture which is most adjacent to the picture to be originally referred to in terms of time is selected as the picture to be alternatively referred to. However, the method of selecting the picture to be alternatively referred to is not limited to this method, and other methods may be used.

That is, when the picture to be alternatively referred to is P picture, since the decoded P picture originally includes an error, the alternative reference picture may be limited not to P picture but to I picture which is most adjacent to the picture to be originally referred to. According to this example, propagation of an error of P picture can be prevented.

As another example, a method of selecting an alternative reference in consideration of characteristic information to be given to each picture may be used. In order to extract this characteristic information, for example, meta data such as scene information, camera information, and the like may be used. Note that meta data is a generic term for additional data which is additionally recorded in association with recorded image data.

Figure 5:
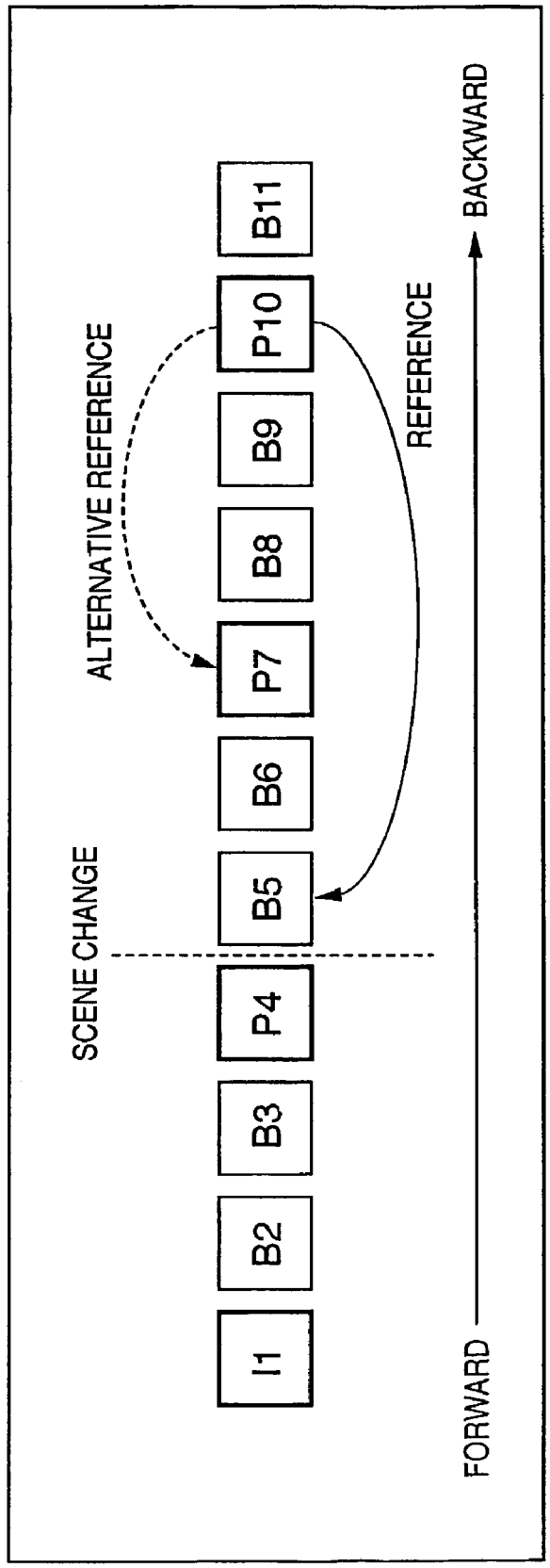
FIG. 5 is a view for explaining the reference relationship of pictures when a scene change has taken place according to the first embodiment of the present invention.

The method of selecting an alternative reference using characteristic information will be described below. FIG. 5 shows an image sequence and some reference relationship. In FIG. 5, I1 to B11 indicate pictures, and P10 picture originally refers to B5 picture. Also, a scene change has taken place between P4 picture and B5 picture.

A case will be examined below wherein only I or P pictures are extracted and played back using such sequence. Upon decoding P10 picture, B5 picture must already have been decoded in general. However, upon search playback of I or P pictures, B5 picture is not decoded. Hence, a picture to be referred to in place of B5 picture is selected. In this case, if I or P picture which is most adjacent in terms of time is selected, P4 picture is selected.

However, in this example, since the scene change has taken place between P4 and B5 pictures, the correlation between P4 and B5 pictures is small. For this reason, when decoding is done with reference to P4 picture in place of B5 picture, an error of the decoded image is more likely to become very large. Hence, in step S402 in the flowchart of FIG. 4, scene information of B5 picture as a reference picture is acquired from meta data associated with P10 picture. Then, I or P picture already decoded, which belongs to the same scene as that of B5 picture and is most adjacent to B5 picture is selected. In this case, P7 picture is selected as a picture to be alternatively referred to.

Note that the scene information of the reference picture, which indicates occurrence of a scene change or the like, is recorded as meta data upon, e.g., encoding.

In the above description, a scene change is detected from scene information, and an alternative reference is selected based on the scene change. Likewise, camera information can be used. More specifically, when I or P picture, which is most adjacent in terms of time, and has camera information corresponding to (or matching) that included in meta data of the picture to be originally referred to, exists, that I picture or the like can be selected as an alternative reference.

Note that the camera information as the characteristic information includes, for example, the brightness of an object, the zoom magnification of a lens, the emission state of a strobe, the AF state, the size of a taken image, the white balance control state, the ND filter state, a photographing mode, and the like upon photographing. Note that such camera information is recorded as meta data upon encoding (i.e., photographing) image data.

[Another Example of Motion Vector Compensation]

In the above description, the motion vector is compensated based on the playback timings of the picture to be originally referred to and that to be alternatively referred to. However, the motion vector compensation method is not limited to such specific method, and compensation may be implemented by other methods.

Figure 6:
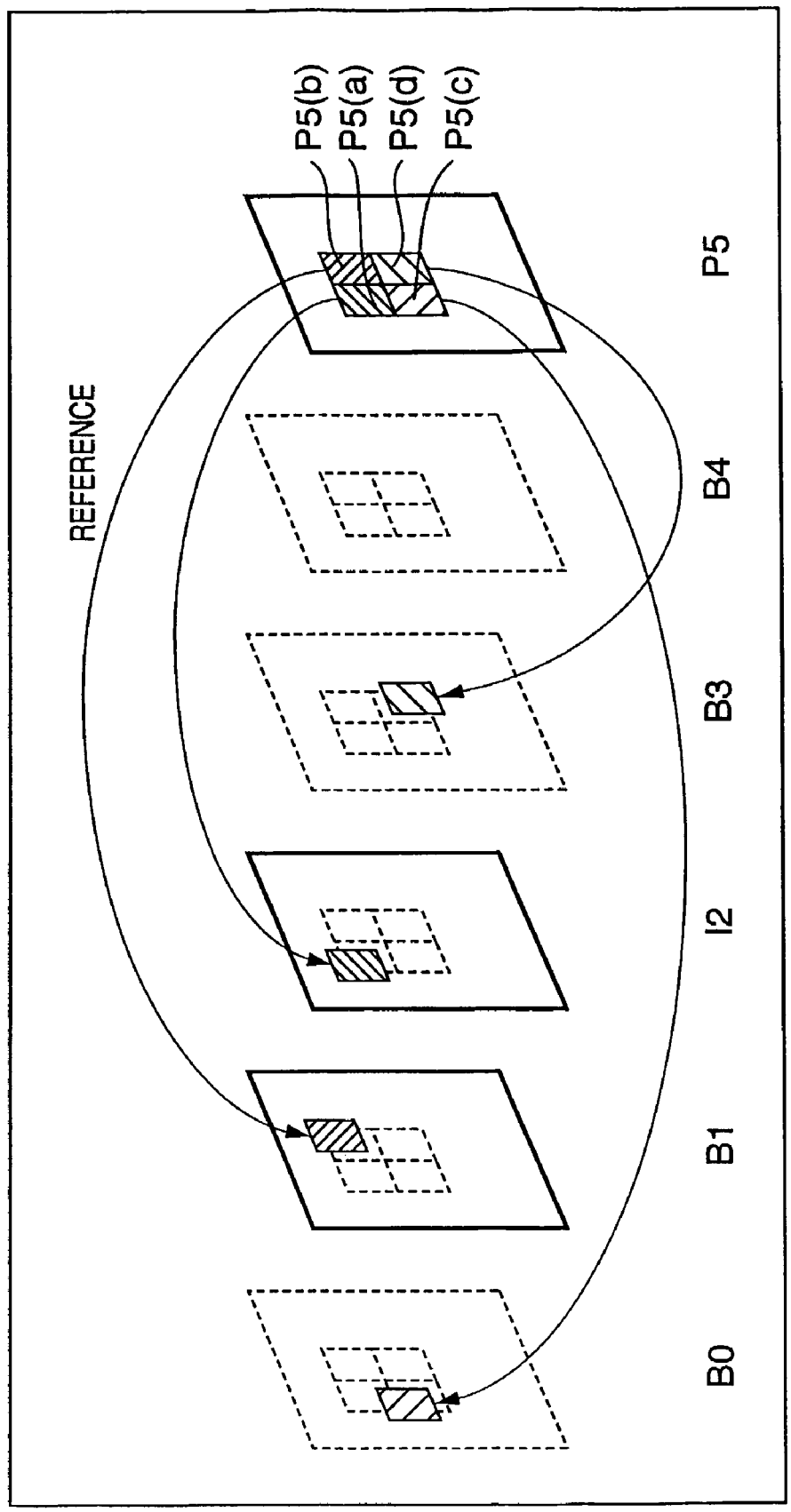
FIG. 6 is a view for explaining an example in which a plurality of blocks in a single picture refer to different pictures according to the first embodiment of the present invention.
Figure 7:
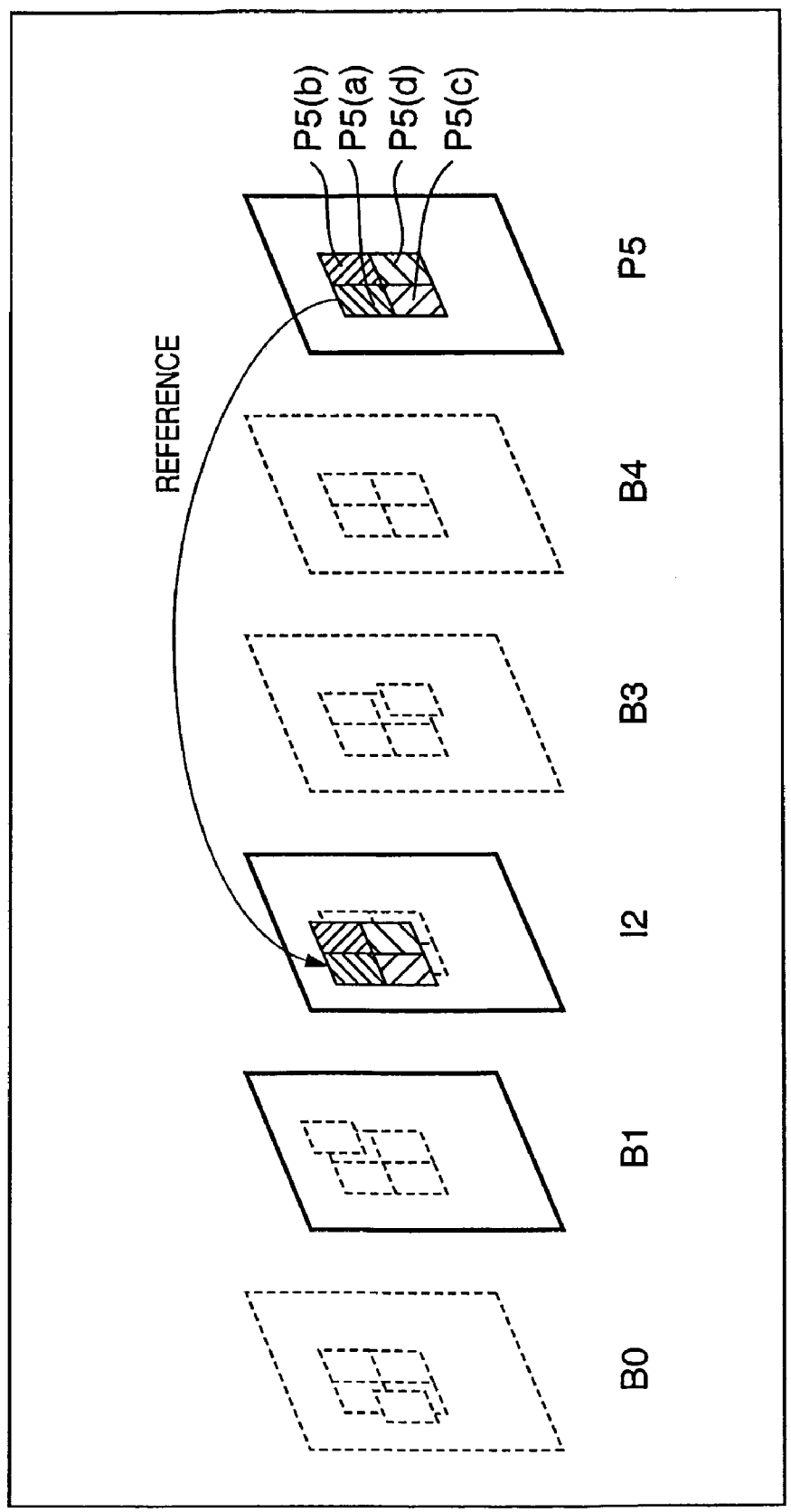
FIG. 7 is a view for explaining an example in which the plurality of blocks in the single picture refer to one picture as an alternative reference according to the first embodiment of the present invention.

For example, a method to be described below may be used. FIGS. 6 and 7 show references of four neighboring blocks in P5 picture. Referring to FIG. 6, P5(*a*) block in P5 picture refers to I2 picture. Likewise, P5(*b*) block refers to B1 picture, P5(*c*) block refers to B0 picture, and B5(*d*) block refers to B3 picture.

As described above, since pictures other than I2 picture are not decoded upon playing back I and P pictures, P5(*b*), P5(*c*), and P5(*d*) blocks cannot be decoded in this state. Hence, an alternative reference picture is detected. In this case, the neighboring P5(*a*) to P5(*d*) blocks are combined together and are considered as one large block. If any of blocks in this large block, which refers to the picture already decoded, is found, that picture is determined as a picture to be alternatively referred to by that entire large block.

In case of FIG. 6, of the large block formed by P5(*a*) to P5(*d*) blocks, only P5(*a*) block refers to I2 picture already decoded. Therefore, I2 picture is determined as an alternative reference for the large block. As for a motion vector, that of P5(*a*) block is alternatively used as those of P5(*b*) to P5(*d*) blocks. As a result, as shown in FIG. 7, the four blocks alternatively refer to I2 picture, and images for four blocks can be decoded.

In this example, only P5(*a*) block of the large block formed by P5(*a*) to P5(*d*) blocks refers to the picture already decoded. If another block refers to a picture already decoded other than I2 picture, one of these pictures must be selected as an alternative reference. The method of selecting an alternative reference picture is not particularly limited. For example, any of a method of selecting a picture which is most adjacent to P5 picture to be decoded in terms of time as an alternative reference picture, a method of selecting I picture in preference to P picture as a reference, a method of selecting a picture which is referred to by a plurality of blocks in the large block more than other blocks as an alternative reference picture, and the like may be used.

In the case shown in FIG. 6, only P5(*a*) block of the large block formed by P5(*a*) to P5(*d*) blocks refers to I2 picture. If there are a plurality of blocks which refer to I2 picture in one large block, a method of using the average value of motion vectors of the blocks which refer to I2 picture as the motion vector of an alternative reference may be adopted.

As described above, the image decoding apparatus according to this embodiment can decode a picture to be decoded using only a picture already decoded, even when playback is made by decoding only some of a plurality of pictures included in a code sequence.

This embodiment has explained triple-speed search playback. In such search playback, since a rough outline of the scene need only be recognized, its object can be achieved as long as certain reproducibility is maintained compared to an original image. Therefore, when a picture is decoded using a picture which is most adjacent to the picture to be originally referred to in terms of time, the reproducibility can be maintained while achieving the above object even when unwanted decoding processing is not performed, thus efficiently executing search playback.

Furthermore, as for a factor such as a scene change that enhances an error, a picture in the same scene as the reference picture can be selected using scene information or camera information. In this way, even when a scene change has taken place, the error produced upon decoding can be maintained low.

[Second Embodiment]

In the description of the first embodiment, the decoding processing is executed after the picture to be alternatively referred to is determined upon decoding. By contrast, in this embodiment, information of a picture to be alternatively referred to is determined in advance upon encoding, and is recorded in a code sequence. Upon decoding, it is done according to the information of the picture to be alternatively referred to. Such embodiment will be described below.

Figure 8:
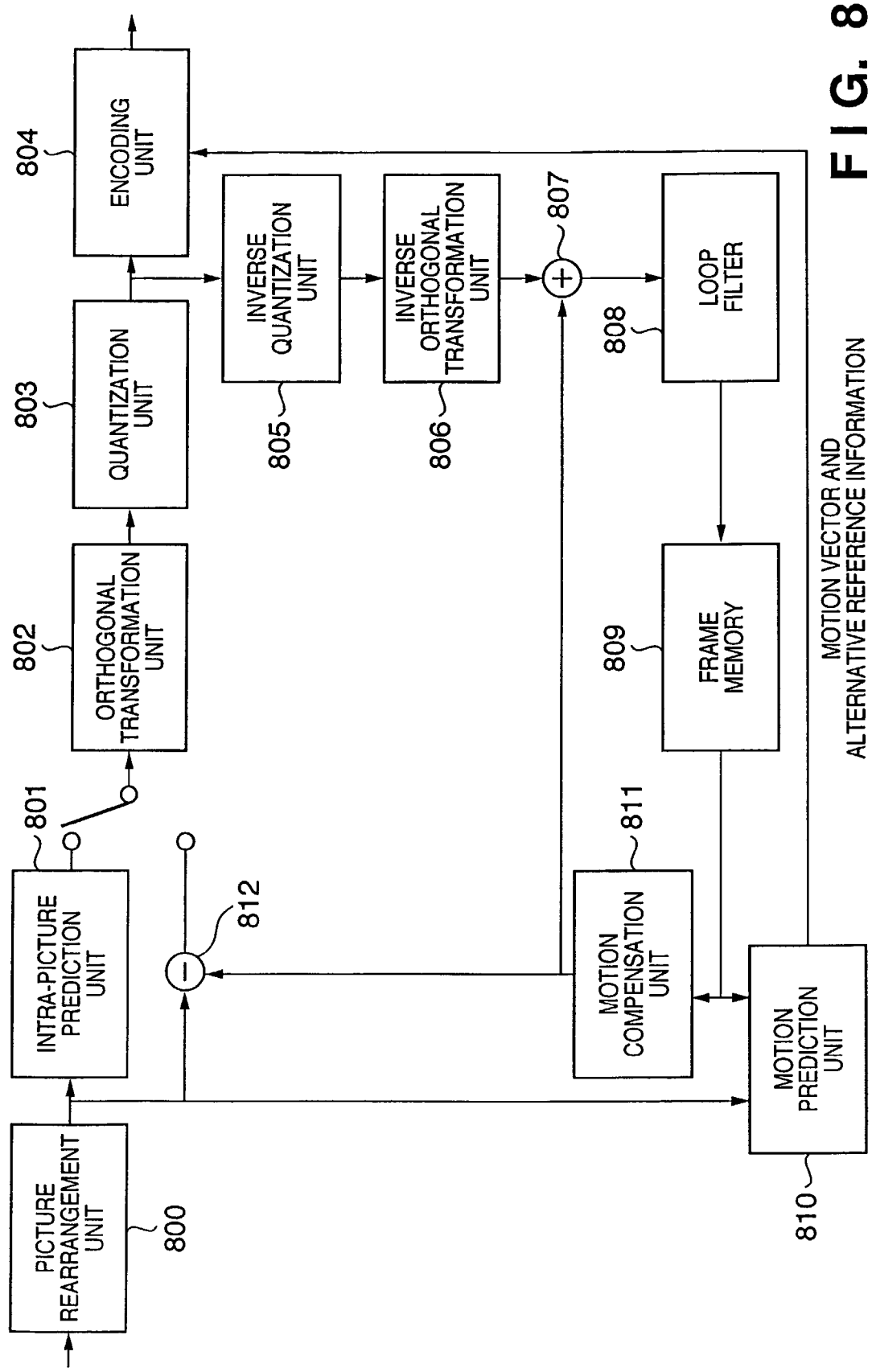
FIG. 8 is a block diagram showing an example of the arrangement of an encoding apparatus according to the second embodiment of the present invention.

An image encoding apparatus according to this embodiment will be described first with reference to FIG. 8. FIG. 8 is a block diagram showing an example of the basic arrangement of an image encoding apparatus according to this embodiment, which performs image compression encoding using H.264. Referring to FIG. 8, reference numeral 800 denotes a picture rearrangement unit; 801, an intra-picture prediction unit; 802, an orthogonal transformation unit; 803, a quantization unit; 804, an encoding unit; 805, an inverse quantization unit; 806, an inverse orthogonal transformation unit; 807, an adder; 808, a loop filter processing unit; 809, a frame memory; 810, a motion prediction unit; 811, a motion compensation unit; and 812, a subtracter.

The operation of the image encoding apparatus shown in FIG. 8 will be described below. When a digital input image signal is input to the picture rearrangement unit 800, the picture rearrangement unit 800 rearranges image pictures in the order they are encoded. This is because since B picture refers to a picture which appears after that picture in terms of time, it must be encoded after a reference picture is encoded.

The image which is rearranged in the encoding order is processed for respective blocks. In case of I picture or a block which is determined to undergo intra-picture prediction, the intra-picture prediction unit 801 predicts pixels in the picture, and outputs differential data from the predicted pixels to the orthogonal transformation unit 802. If the input image is B or P picture, and inter-picture prediction is to be made, a differential image between a prediction image generated by inter-picture prediction (to be described later) and the current image is output to the orthogonal transformation unit 802. The orthogonal transformation unit 802 performs 4×4 (pixels) integer transformation to convert the image into frequency components. The quantization unit 803 quantizes data of the input frequency components. Image data quantized by the quantization unit 803 is output to the encoding unit 804 and the inverse quantization unit 805 which locally decodes the image data.

On the other hand, the inverse quantization unit 805 inversely quantizes the image data quantized by the quantization unit 803 to decode frequency components, and the inverse orthogonal transformation unit 806 decodes a prediction error image (differential image) by inverse orthogonal transformation. If an image output from the inverse quantization unit 805 is that of P or B picture, the adder 807 adds the differential image and a motion-compensated image to decode a picture image. The decoded image undergoes filter processing for removing a block distortion by the loop filter (processing unit) 808, and is then stored in the frame memory 809. The frame memory 809 can store an arbitrary number of pictures, which can be used as reference pictures.

The motion compensation unit 811 searches the decoded images stored in the frame memory 809 for a reference image which has a smallest difference from the input image in an inter-picture prediction mode, calculates a motion vector to that reference image, and outputs the motion vector to the encoding unit 804. Also, position information of I or P picture which is most adjacent to the picture which is selected as the reference image in terms of time is output to the encoding unit 804 as alternative reference information upon decoding.

The motion compensation unit 811 makes an arithmetic operation indicated by the motion vector and reference direction information, and outputs a motion-compensated image.

The subtracter 812 calculates a difference between the input image and motion-compensated image, and outputs the differential image to the orthogonal transformation unit 802. The encoding unit 804 generates a code sequence by performing variable-length encoding or arithmetic encoding of the image data, motion vector information, and alternative reference information, and outputs the generated code sequence.

As for selection of an alternative reference picture, not only the method of selecting I or P picture adjacent to the reference image but also any of the selection methods described in the first embodiment may be adopted.

A decoding apparatus which plays back the code sequence generated in this way will be described below with reference to FIG. 9.

Figure 9:
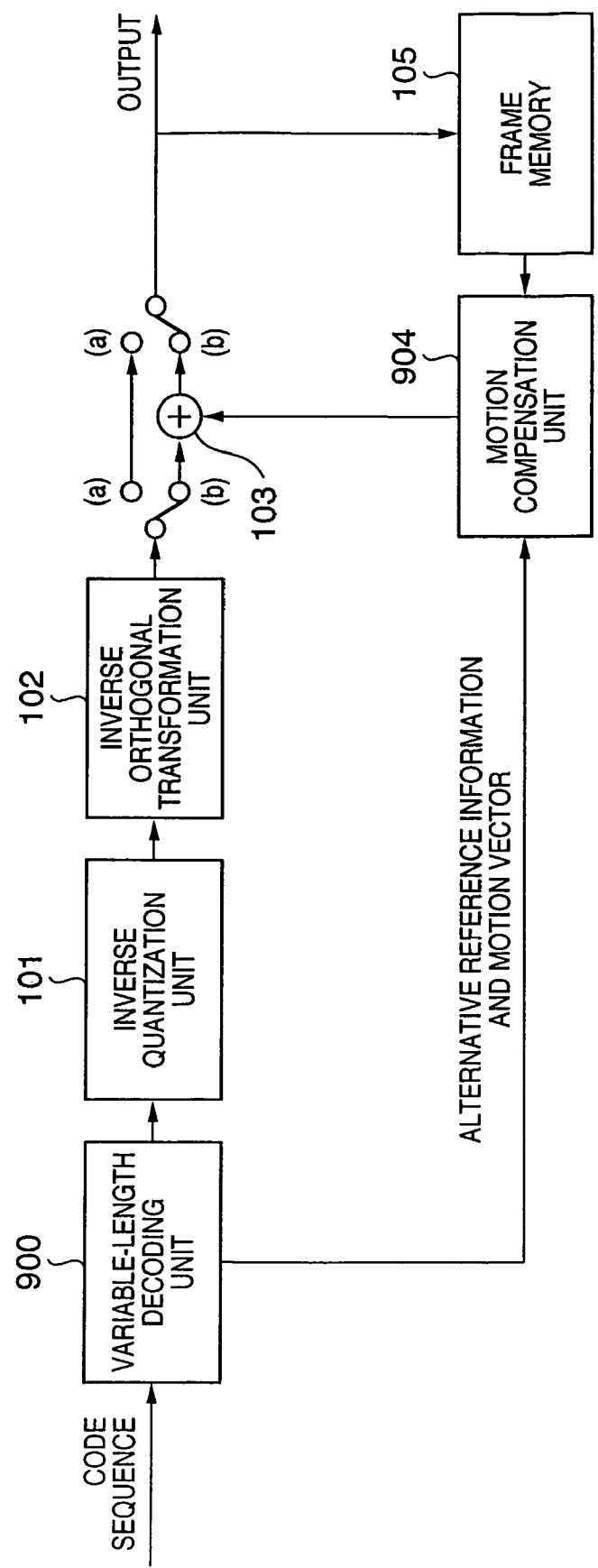
FIG. 9 is a block diagram showing an example of a decoding apparatus according to the second embodiment of the present invention.
Figure 10:
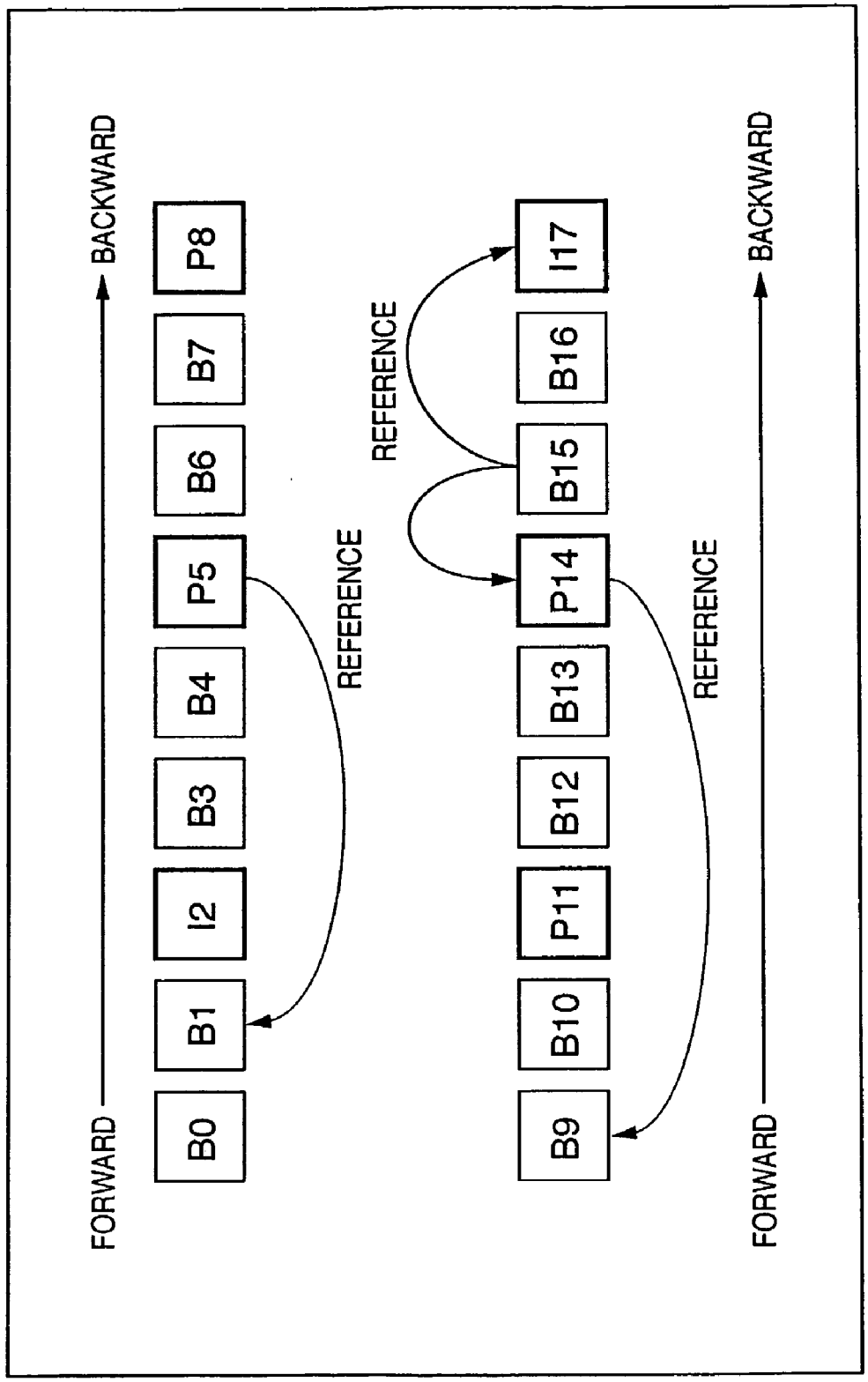
FIG. 10 shows the reference relationship of pictures according to the prior art of the present invention.
Figure 11:
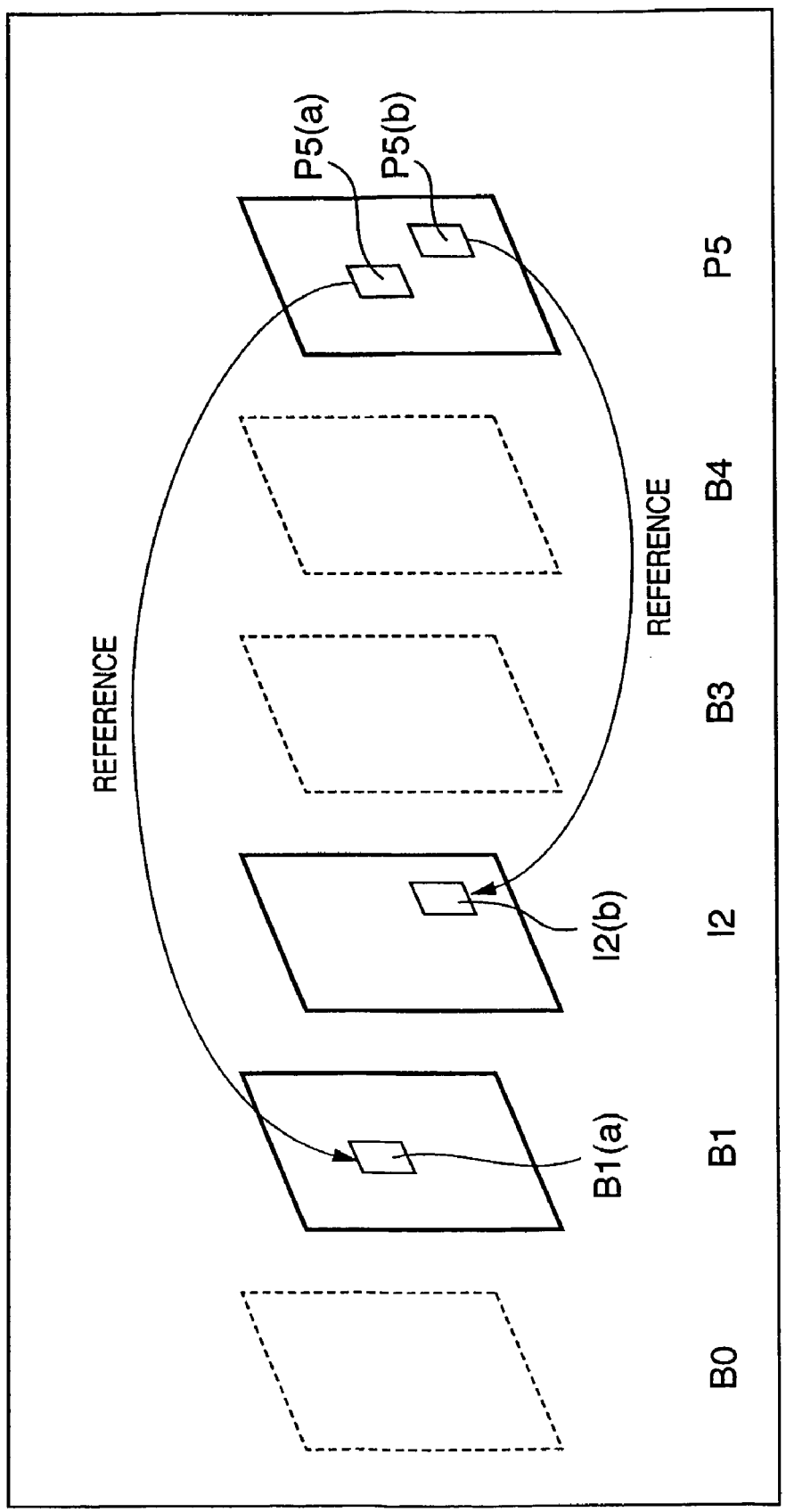
FIG. 11 shows the reference relationship of pictures according to the prior art of the present invention.

FIG. 9 is a block diagram showing the arrangement of an image decoding apparatus as in FIG. 1. Blocks other than a variable-length decoding unit 900 and motion compensation unit 904 are the same as those denoted by the same reference numerals in the first embodiment, and a description thereof will be omitted.

A case will be explained below wherein search playback is performed by playing back only I and P pictures of the input code sequence as in the first embodiment.

Upon reception of the code sequence, the variable-length decoding unit 900 performs variable-length decoding processing, and decodes the code sequence to quantized orthogonal transformation coefficients and image related information. The image related information stores motion vector data and alternative reference information. The motion vector data and alternative reference information are output to the motion compensation unit 904, and the quantized orthogonal transformation coefficient data are output to the inverse quantization unit 101. The processes in the inverse quantization unit 101, inverse orthogonal transformation unit 102, and frame memory are the same as those in the first embodiment.

The motion compensation unit 904 generates a prediction image by performing motion compensation based on the motion vector data and a locally decoded image stored in the frame memory 105. When a reference picture of a picture to be decoded is not decoded, an alternative reference picture is determined. After the alternative reference is determined, the processing for compensating the motion vector data, generating an alternative prediction image, and adding that image by the adder 103 is the same as the first embodiment, and a description thereof will be omitted.

As described above, according to this embodiment, since an alternative reference picture is designated upon encoding, the need for processing for detecting the alternative reference picture upon decoding can be obviated, and the processing load upon search playback can be further reduced.

As the alternative reference information, not only the alternative reference picture but also motion vector information to the alternative reference picture and the like may be recorded together. The motion vector information may be obtained either by compensating the motion vector information calculated for a picture to be originally referred to or by calculating new motion vector information for the alternative reference picture.

Each of the above embodiments has exemplified H.264 as the encoding method. However, the encoding method is not limited to such specific method, and any other encoding methods may be used as long as they use inter-picture prediction.

[Other Embodiments]

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

Furthermore, storage media such as, a Floppy® disk, hard disk, optical disk, magneto-optical disk, CD-ROM, CD-R, magnetic tape, magnetic and nonvolatile type memory cards, and ROM can be used to supply the program code.

The functions of the above-mentioned embodiments may be implemented not only by executing the readout program code by the computer but also by some or all of actual processing operations executed by an operating system (OS) running on the computer on the basis of an instruction of the program code.

Moreover, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the aforementioned storage medium, that storage medium preferably stores the program codes corresponding to the flowcharts described in the embodiments. Meanwhile, the present invention is not limited to the aforementioned embodiments, and various changes and modifications may be made within the spirit and scope of the present invention. Therefore, to apprise the public of the scope of the present invention, the following claims are made.

In this way, we believe that the operation and arrangement of the present invention are apparent from the above description. It will become immediately apparent that the disclosed and described method, apparatus, and system be suitably characterized, and various and changes can be made without departing from the scope of the present invention defined by the following claims.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-156197 filed on May 27, 2005, which is hereby incorporated by reference herein in its entirety.

The invention claimed is:

1. An image data decoding method for decoding compression encoded image data including a plurality of image pictures, wherein each of the plurality of image pictures is divided into a plurality of blocks each having a predetermined number of pixels, and each of the plurality of image pictures is able to refer to respective reference pictures for each block, comprising:

a selection step of selecting, when one of the plurality of image pictures is to be decoded, and when a first reference picture to be referred to by each block included in the one image picture to be decoded is not decoded, a second reference picture from a picture already decoded as an alternative reference for each block of the one image picture to be decoded; and a decoding step of decoding each block included in the one image picture to be decoded with reference to the second reference picture as an alternative to the first reference picture, wherein the selecting in said selection step and the decoding in said decoding step are executed when the plurality of image pictures is being decoded at a predetermined interval.

2. The method according to claim 1, wherein the plurality of image pictures includes a first image picture which is compression encoded without referring to any other image picture, a second image picture which is compression encoded with reference to one different picture, and a third image picture which is compression encoded with reference to two different image pictures, and the decoding in the decoding step is done when only the first image picture and the second image picture of the plurality of image pictures are decoded.

3. The method according to claim 1, wherein the plurality of pictures includes an I picture, a P picture, and a B picture, and the decoding in the decoding step is done when only the I picture and the P picture of the plurality of image pictures are decoded.

4. The method according to claim 1, wherein in the selection step, a picture adjacent in terms of time to the first reference picture is selected as the second reference picture from the pictures already decoded.

5. The method according to claim 2, wherein in the selection step, the first image picture adjacent in terms of time to the first reference picture is selected as the second reference picture from the pictures already decoded.

6. The method according to claim 1, wherein the selection step comprises a characteristic information acquisition step of acquiring characteristic information associated with the one image picture to be decoded, and the second reference picture is selected based on the characteristic information associated with the first reference picture.

7. The method according to claim 6, wherein an image picture having characteristic information corresponding to the characteristic information associated with the first reference picture of the image pictures already decoded is selected in the selection step as the second reference picture.

8. The method according to claim 1, wherein the decoding step comprises a compensation step of compensating first motion information given for each block included in the one image picture to be decoded, and wherein each block included in the one image picture to be decoded is decoded by utilizing the compensated first motion information and the second reference picture.

9. The method according to claim 8, wherein the first motion information is compensated in the compensation step based on a time relationship of the first reference picture and the second reference picture with respect to the image picture to be decoded.

10. The method according to claim 2, wherein when a first block in the one image picture to be decoded is a block which is compression encoded with reference to one of the first image picture and the second image picture, and a second block that neighbors the first block is compression encoded with reference to the third image picture, one of the first image picture and the second image picture which is referred to by the first block is selected in the selection step as the second reference picture in association with the second block.

11. The method according to claim 1, wherein an image which undergoes motion compensation using the second reference picture is output in the decoding step as a decoded image of the image picture to be decoded.

12. The method according to claim 1, wherein the one image picture to be decoded includes information which designates the second reference picture as the alternative reference, and the second reference information is selected in the selection step based on the designation.

13. The method according to claim 12, wherein the image picture to be decoded further includes second motion information given in association with the designated second reference picture, and wherein each block included in the one image picture to be decoded is decoded by utilizing the second motion information and the second reference picture in the decoding step.

14. An image encoding method for compression encoding, in block units, image data including a plurality of image pictures, each of the block units being obtained by dividing each of the plurality of image pictures into areas of a predetermined number of pixels, comprising:

a first encoding step of compression encoding each block included in a first image picture to be encoded without referring to any other image pictures;

a second encoding step of compression encoding each block included in a second image picture to be encoded with reference to at least one image picture selected for each block; and a selection step of selecting, when the one image picture which is referred to by each block included in the second image picture to be encoded in the second encoding step is an image picture which is compression encoded with reference to another image picture, one of a third image picture which is compression encoded without referring to any other image pictures and a fourth image picture which is compression encoded with reference to one different image picture as an alternative reference image picture for each block, wherein information of the alternative reference image picture is appended to encoded data of the second image picture encoded in the second encoding step.

15. A non-transitory computer readable storage memory storing a computer program which causes a computer to execute a method according to claim 1.

16. An image decoding apparatus for decoding compression encoded image data including a plurality of image pictures, wherein each of the plurality of image pictures is divided into a plurality of blocks each having a predetermined number of pixels, and each of the plurality of image pictures is able to refer to respective reference pictures for each block, comprising:

a selector configured to, when one of the plurality of image pictures is to be decoded, and when a first reference picture to be referred to by each block included in the one image to be decoded is not decoded, select a second reference picture from a picture already decoded as an alternative reference for each block of the one image picture to be decoded; and a decoder configured to decode each block included in the one image picture to be decoded with reference to the second reference picture as an alternative to the first reference picture, wherein the selecting by said selector and the decoding by said decoder are executed when the plurality of image pictures is being decoded at a predetermined interval.

17. An image encoding apparatus for compression encoding, in block units, image data including a plurality of image pictures, each of the block units being obtained by dividing each of the plurality of image pictures into areas of a predetermined number of pixels, comprising:
- an encoder configured to execute a first compression encoding process that encodes each block included in a first image picture to be encoded without referring to any other image pictures, and
- configured to execute a second compression encoding process that encodes each block included in a second image picture to be encoded with reference to at least one image picture selected for each block; and
- a selector configured to when the one image picture which is referred to by each block included in the second image picture to be encoded is an image picture which is compression encoded with reference to another image picture, select one of a third image picture which is compression encoded without referring to any other image pictures and a fourth image picture which is compression encoded with reference to one different image picture as an alternative reference image picture for each block,
- wherein information of the alternative reference image picture is appended to encoded data of the second image picture encoded in the second encoding process.

18. A non-transitory computer readable storage memory storing a computer program which causes a computer to execute a method according to claim 14.

\* \* \* \* \*